US012226715B2

(12) United States Patent
Eshelman et al.

(10) Patent No.: US 12,226,715 B2
(45) Date of Patent: Feb. 18, 2025

(54) DEGASSERS, DEGASSING SYSTEMS AND THE METHODS OF USING THEM

(71) Applicant: VERSUM MATERIALS US, LLC, Tempe, AZ (US)

(72) Inventors: David C. Eshelman, Escondido, CA (US); Bradley Taylor Reese, Trexlertown, PA (US); Jeffery C. Barthold, Barto, PA (US); Christopher D. Fontana, Hatfield, PA (US)

(73) Assignee: Versum Materials US, LLC, Tempe, AZ (US)

( * ) Notice: Subject to any disclaimer, the term of this patent is extended or adjusted under 35 U.S.C. 154(b) by 495 days.

(21) Appl. No.: 17/442,705

(22) PCT Filed: Mar. 24, 2020

(86) PCT No.: PCT/US2020/024494
§ 371 (c)(1),
(2) Date: Sep. 24, 2021

(87) PCT Pub. No.: WO2020/198244
PCT Pub. Date: Oct. 1, 2020

(65) Prior Publication Data
US 2022/0176275 A1 Jun. 9, 2022

Related U.S. Application Data

(60) Provisional application No. 62/824,094, filed on Mar. 26, 2019.

(51) Int. Cl.
*B01D 19/00* (2006.01)
*B01D 63/06* (2006.01)

(52) U.S. Cl.
CPC ....... *B01D 19/0036* (2013.01); *B01D 63/069* (2022.08); *B01D 2221/14* (2013.01)

(58) Field of Classification Search
CPC ............. B01D 19/0036; B01D 63/069; B01D 2221/14; B01D 2317/04; B01D 63/02;
(Continued)

(56) References Cited

U.S. PATENT DOCUMENTS 3,973,930 A * 8/1976 Burgess ............. B01D 19/0052
95/266
5,340,384 A * 8/1994 Sims ...................... G01N 30/34
96/10
(Continued)

FOREIGN PATENT DOCUMENTS

CH 0855206 A1 * 7/1998
CN 201394381 2/2010
(Continued)

*Primary Examiner* — Robert A Hopkins
*Assistant Examiner* — Qianping He
(74) *Attorney, Agent, or Firm* — Daniel A. DeMarah, Jr.

(57) ABSTRACT

Degassers, degassing systems, and methods of using degassers to remove gas molecules entrapped or dissolved in a processing liquid. The degasser has a vacuum chamber with one or more walls; one or multiple inlets and one or multiple outlets through which the liquid is respectively passed into and out of the vacuum chamber, the inlet(s) and the outlet(s) penetrating the one or more walls; one or multiple separators located inside the vacuum chamber and being pervious to the gas molecules but impervious to the liquid; at least one vacuum for applying through a vacuum port a pressure differential across the separator(s) to cause the gas molecules to leave the liquid and to permeate through the separator(s) thereby removing the entrapped or dissolved gas from the liquid; and optionally one or multiple feed lines in fluid communication with the inlet(s) and two or more than two separators.

19 Claims, 5 Drawing Sheets

(58) Field of Classification Search
CPC ...... B01D 63/024; B01D 63/06; B01D 19/00; B01D 65/003; B01D 69/08; B01D 19/0063; B01D 2313/19
USPC .......................................................... 95/247
See application file for complete search history.

(56) References Cited

U.S. PATENT DOCUMENTS

| | | |
|---|---|---|
| 5,425,803 A | 6/1995 | van Schravendijk et al. |
| 5,645,625 A | 7/1997 | van Schravendijk et al. |
| 5,772,736 A | 6/1998 | van Schravendijk et al. |
| 6,193,893 B1 | 2/2001 | Mazzei et al. |
| 6,939,392 B2 | 9/2005 | Huang et al. |
| 7,377,112 B2 | 5/2008 | Spadaccini et al. |
| 7,393,388 B2 | 7/2008 | Spadaccini et al. |
| 7,435,283 B2 | 10/2008 | Tillman et al. |
| 7,465,336 B2 | 12/2008 | McHugh |
| 7,569,099 B2 | 8/2009 | Coffin et al. |
| 7,582,137 B2 | 9/2009 | Chen et al. |
| 7,615,104 B2 | 11/2009 | Cordatos et al. |
| 7,687,110 B2 | 3/2010 | Kobrin et al. |
| 7,824,470 B2 | 11/2010 | Chiappetta et al. |
| 2004/0163541 A1 | 8/2004 | Hayashi et al. |
| 2008/0034922 A1* | 2/2008 | Bruce .................. C21C 7/10 75/375 |
| 2009/0301306 A1 | 12/2009 | Ooya et al. |
| 2012/0240770 A1 | 9/2012 | Gerner et al. |
| 2013/0247760 A1* | 9/2013 | Taylor ............... B01D 19/0031 96/6 |
| 2015/0380278 A1 | 12/2015 | Landis et al. |
| 2019/0151801 A1 | 5/2019 | Suganuma et al. |

FOREIGN PATENT DOCUMENTS

| | | |
|---|---|---|
| CN | 202569664 U | 12/2012 |
| CN | 107111324 | 8/2017 |
| CN | 107111324 A | 8/2017 |
| CN | 108408672 | 8/2018 |
| CN | 108408672 A | 8/2018 |
| EP | 0622475 A1 | 11/1994 |
| EP | 1529560 A2 | 11/2005 |
| JP | 1993-103956 A | 4/1993 |
| JP | 1996-206408 A | 8/1996 |
| JP | 2000-350903 A | 12/2000 |
| JP | 2006234650 | 9/2006 |
| JP | 2008-238127 A | 10/2008 |
| JP | 2010-162501 A | 7/2010 |
| JP | 2010-194423 A | 9/2010 |
| WO | 9904060 | 1/1999 |
| WO | 2005080630 A1 | 9/2005 |
| WO | 2008/0088293 A1 | 7/2008 |
| WO | 2008088293 A1 | 7/2008 |
| WO | 2017040408 A1 | 3/2017 |

* cited by examiner

DEGASSERS, DEGASSING SYSTEMS AND THE METHODS OF USING THEM

CROSS-REFERENCE TO RELATED APPLICATION

This application is a National Stage filing under 35 U.S.C. 371 of International Patent Application No. PCT/US2020/024494, filed on Mar. 26, 2020, which claims priority to U.S. Provisional Application No. 62/824,094, filed on Mar. 26, 2019. The entire contents of these applications are incorporated herein by reference in their entirety.

BACKGROUND OF THE INVENTION

This invention relates to semiconductor processing apparatus and operations and, more particularly, to a method and apparatus for removing gasses entrapped or dissolved in semiconductor processing liquids before such liquids are vaporized and delivered to a semiconductor processing chamber.

In semiconductor wafer processing operations, wafer processing reactant fluids are often supplied to the interior of a wafer processing chamber in a gaseous form. It is, however, common for some of these reactants to be chemical precursors which are stored at some distant storage point in liquid form. The reactants are then supplied from the liquid storage, through a flow meter to be vaporized in a vaporizer and thereafter to the chamber in gaseous form.

A typical example of a wafer processing system incorporating these elements and a prior art degasser 134 is schematically illustrated in FIG. 1. In this figure a typical chemical vapor deposition (CVD) wafer processing apparatus 110 is shown to include a processing chamber 112. A standard commercial wafer processing liquid or fluid 114 (the terms liquid and fluid may be used interchangeably) is housed in a liquid form in a sealed fluid container 116. For CVD processes, the processing liquid 114 (sold under brand names such as the abbreviation TEOS for tetraethyl orthosilicate) contains a source of silicon and optionally a dopant liquid such as TEOP ($PO(C_2OH_5)_3$), TMB (trimethoxyboran, trimethylborate, $(CH_3O)_3B$)), TMP (trimethoxyphosphine, trimethylphosphite, $(CH_3O)_3P$)), TEP (triethyl phosphate), and the like.

The liquid 114 is supplied to the chamber 112 via a liquid flow meter 118 and a vaporizer 130, all of which are connected together by a source line 139. The flow meter 118 is intended to very accurately regulate the amount of processing fluid 114 passing into the chamber 112 and the vaporizer 130 functions to convert the fluid 114 from its liquid to its gaseous state. The liquid 114 is moved along the source line 139 by injecting an inert gas such as Helium, Argon or Nitrogen under pressure into a space 124 above the surface of the liquid 114 in the container 116. (The inert gas is injected through a delivery tube 150 from a source of the inert gas along the direction arrow 152.) As a result of the pressurizing effect of the inert gas, the fluid 114 flows under pressure along the source line 139 and is controlled and vaporized before flowing via a conduit 149 into the chamber 112. A fluid control valve 128 is in communication via a connection line 126 with the flow meter 118. Should the flow meter 118 sense that an excessive amount of processing fluid 114 is flowing into the conduit 149, it signals the control valve 128 which, in turn, operates to restrict the flow of the fluid 114. Similarly, if the flow meter 118 senses that too little fluid is flowing in the conduit 149, it signals the control valve 128 which opens to allow additional fluid 114 to flow into the chamber 112.

The inert gas injected into the space 124 that becomes entrapped or dissolved in the processing fluid 114 is removed by a degasser 134 before the liquid 114 flows through the flow meter 118, so the flow meter 118 is not affected by the gas that was entrapped or dissolved in the liquid 114 improving the accuracy of the volume of processing fluid 114 passing into the chamber 112.

Known commercial degassing equipment has been in use for years, even decades, to remove gas from fluids used in semiconductor manufacturing; however, increasing or decreasing demand for degassed fluid or the addition of one or more than one fluid to a processing chamber, to date, requires the addition or subtraction of individual degassing systems, taking up valuable floor space in a fabrication facility and adding to the capital equipment costs. Existing commercial degassing equipment is inflexible to increasing and decreasing demand. The need, therefore, exists for improved degasser equipment and systems.

SUMMARY OF THE INVENTION

This invention provides a degasser and degasser system (those terms may be used interchangeably) for removing gas entrapped or dissolved in a processing fluid or processing liquid comprising (i) a vacuum chamber comprising one or more than one chamber wall; (ii) one or more than one fluid inlet and one or more than one fluid outlet through which a processing liquid is respectively passed into and out of the vacuum chamber, the one or more than one inlet and the one or more than one outlet penetrate the one or more than one vacuum chamber wall; (iii) one or more than one separator located inside the vacuum chamber and being configured to be pervious to the molecules of the entrapped or dissolved gas but impervious to the molecules of the liquid; (iv) at least one vacuum for applying a pressure differential across the separator to cause molecules of the entrapped or dissolved gas to leave the liquid and to permeate through the one or more than one separator thereby removing the entrapped or dissolved gas from the processing liquid; and (v) optionally one or more than one feed line in fluid communication with the one or more than one inlet and two or more than two separators.

In one aspect of the invention the degasser further comprises (v) one or more than one feed line connected to the one or more than one inlet and having two or more than two junctions connecting two or more than two separators to the one or more than one feed line if the number of separators is greater than the number of inlets.

In a further aspect of the invention, alone or in combination with other aspects, the degasser comprises two or more separators, or three or more separators.

In a further aspect of the invention, alone or in combination with other aspects, the degasser comprises one inlet or two or more inlets or three or more inlets.

In a further aspect of the invention, alone or in combination with other aspects, the degasser comprises one outlet, or two or more outlets, or three or more outlets.

In a further aspect of the invention, alone or in combination with other aspects, the degasser comprises a feed line in fluid communication with two or more separators.

In a further aspect of the invention, alone or in combination with other aspects, the degasser comprises a feed line in fluid communication with three or more separators.

In a further aspect of the invention, alone or in combination with other aspects, the degasser comprises a collection line in fluid communication with two or more separators, or with three or more separators.

In a further aspect of the invention, alone or in combination with other aspects, the degasser comprises at least one valve in the feed line and at least one valve in the collection line that when closed isolate a flow path comprising an inlet, separator, and outlet from one or more other flow paths comprising one or more than one other separator in the degasser.

In a further aspect of the invention, alone or in combination with other aspects, the degasser comprises at least one valve upstream of each separator except optionally for one separator so that all but one separator can be isolated from that one separator.

In a further aspect of the invention, alone or in combination with other aspects, the degasser comprises a pressure gauge, a variable speed pump in fluid communication with the vacuum chamber, and a controller in electrical communication with the pressure gauge and the pump to adjust pump speed of the variable speed pump when the pressure is not at a predetermined pressure. By "predetermined" is meant determined beforehand, so that the predetermined characteristic (here, pressure) must be determined, i.e., chosen or at least known, in advance of some event (here, adjusting pump speed).

In a further aspect of the invention, alone or in combination with other aspects, a first separator degasses a first fluid and a second separator degasses a second fluid.

In a further aspect of the invention, alone or in combination with other aspects, the degasser comprises a housing.

The invention further provides a method of degassing a fluid comprising the steps of flowing a fluid through any of the embodiments of the degasser disclosed herein.

In an additional aspect, alone or in combination with other aspects, the method of degassing a fluid further comprises the steps of increasing the amount of fluid degassed in the degasser by either manually or automatically opening closed valves in fluid communication with one or more than one separator and directing fluid through the one or more than one separator (optionally in response to sensors sensing or the manual increase in demand for the degassed fluid at the point of use).

In another aspect of the invention, alone or in combination with other aspects of the invention, the automatic process of opening closed valves may be in response to a flow meter or rate of change of the fluid weight measured by a scale on which a source for the fluid may be located. The scale and the source of the fluid may optionally be located within a cabinet.

In another aspect of the invention, alone or in combination with other aspects of the invention, the method further comprises the step of degassing two different fluids simultaneously. The two different fluids are directed through at least two different separators.

In another aspect of the invention, alone or in combination with other aspects of the invention, the method further comprises the step of isolating one separator from one or more other separators that are degassing fluid.

The disclosure provides a method and an apparatus that achieves one or more of the following benefits: (1) removal of entrapped or dissolved gas from semiconductor wafer processing fluid before such processing fluid arrives at the means controlling the supply of such fluid to a semiconductor wafer processing apparatus, thereby, the fluid may be more accurately controlled; (2) degassing one or more than one fluid through one degassing system comprising a single vacuum chamber and requiring only one depressurization means and/or one control system through one or more than one separator; (3) degassing one or more than one fluid through one vacuum chamber, requiring only one depressurization means and/or one control system at increasing or decreasing flow rates of that first fluid and/or second fluid which may be in response to demand at the point of use.

These and other advantages of the present disclosure will no doubt become apparent to those skilled in the art after having read the following detailed description of the preferred embodiments.

DESCRIPTION OF THE FIGURES

The disclosure is best understood from the following detailed description when read in connection with the accompanying drawing. Included in the drawing are the following figures.

DETAILED DESCRIPTION OF THE DISCLOSURE

Figure 1:
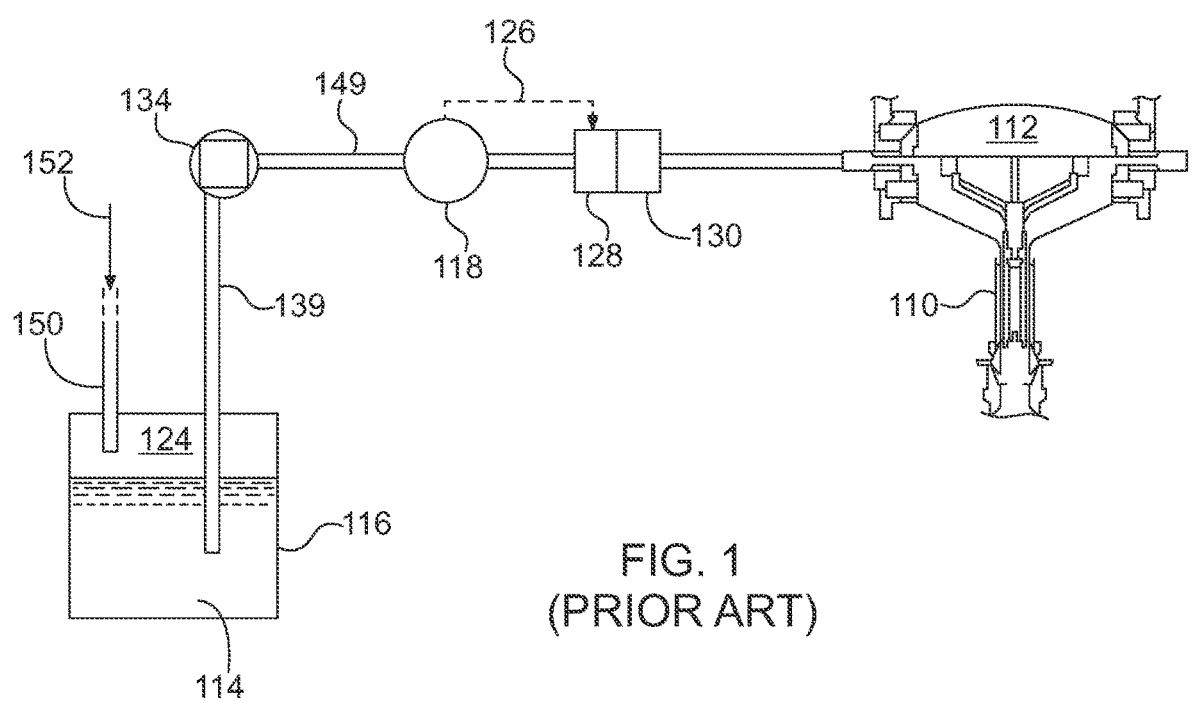
FIG. 1 is a prior art schematic representation of a semiconductor wafer processing system.

Embodiments of the degasser of the invention will be described in greater detail below with reference to FIGS. 2 to 5. The degasser operates to remove any of the inert gas that has been entrapped or dissolved in a processing fluid. As a result of the operation of the degasser, the processing fluid delivered by a conduit to a tool has little or no entrapped or dissolved gas in the processing fluid. The liquid flow meter is presented with a substantially gas-free liquid and therefore can accurately measure the amount of liquid passing along the conduit on its way to the tool.

An attempt was made to give elements that are the same or similar in FIGS. 2-5 the same or similar reference numerals.

Figure 2:
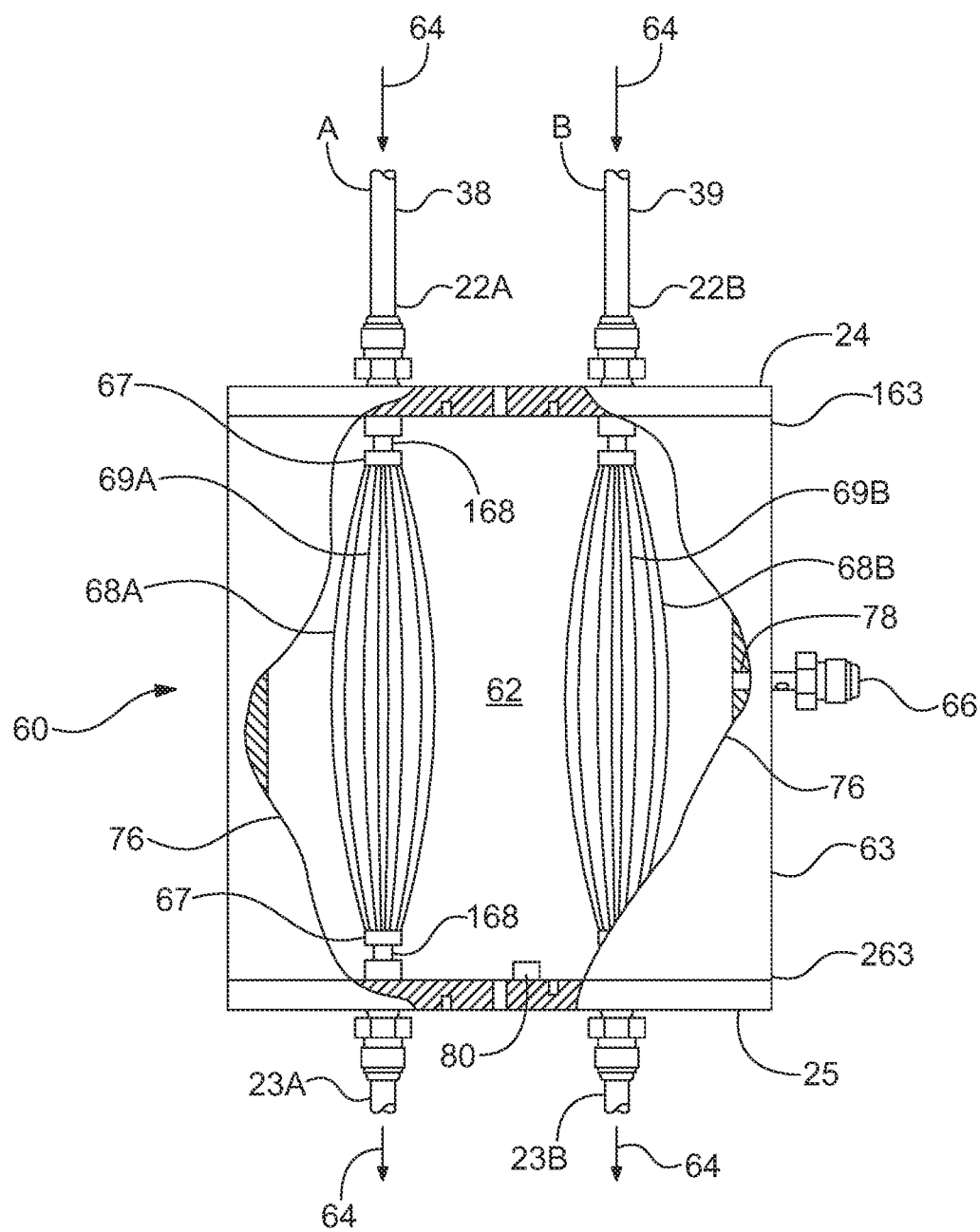
FIG. 2 is a partial cross-sectional view of part of a degasser according to an embodiment of the invention.

One embodiment of a portion of the degasser of the invention is shown in FIG. 2. FIG. 2 shows one example of a vacuum chamber 62 and the one or more than one separator housed within the vacuum chamber 62. The vacuum chamber 62 as shown is defined by a vertical cylinder wall 63, a top wall 24, and an oppositely located bottom wall 25. First and second fluid inlets 22A, 22B (collectively or singly, the inlet 22) are located at and penetrate the top wall 24, and first and second fluid outlets 23A, 23B (collectively or singly, the outlet 23) are located at and penetrate the bottom wall 25. (Note, inlets and outlets can be located anywhere and pass through any wall, even the same wall of the vacuum chamber 62. In addition, although the directional terms "top," "bottom," "vertical," and the like are used to describe the embodiments shown, the terms are not meant to be limiting.) When flowing, fluid flows through the degasser 60 in the direction indicated by arrows 64 and through first and/or second separators 68A, 68B (collectively or singly, the separator 68) constituted of a bundle of tubes, each tube comprising or being formed from separator material. The degasser 60 comprises a depressurizer such as a vacuum (not shown) that is connected to the vacuum chamber 62 via a vacuum port 66. When the degasser 60 is in use, with one or more than one fluid flowing through one or more separators 68A, 68B, the pressure within the vacuum chamber 62 is reduced to a predetermined level, which may be between 10 mTorr to 150 Torr by evacuating the vacuum chamber 62 through the vacuum port 66. The pressure of the fluid may be between 10 to 30 psig. The pressure differential draws the gas in the fluid through the tubes of the separators 68A, 68B that are permeable to the gas but not the liquid. The pressure across the tubes may be from 20 to 100 psi.

In the embodiment shown in FIG. 2, the top wall 24 or the bottom wall 25 or both may be removable from the vacuum chamber 62. Alternatively, the top wall 24 and/or the bottom wall 25 may be welded to the cylindrical wall 63. In alternative embodiments, an opening (not shown) in the cylindrical wall 63 may be provided to access the vacuum chamber 62 and the one or more separators 68A, 68B contained in the vacuum chamber 62. Preferably at least one of the top wall 24 or the bottom wall 25 is removable from the cylindrical wall 63 of the vacuum chamber 62. In one embodiment, the top wall 24 and the bottom wall 25 may both be bolted to the opposite ends of the cylindrical wall 63 with a gasket (not shown), for example an O-ring (not shown), where the top wall 24 and one end 163 of the cylindrical wall 63 meet and a gasket where the bottom wall 25 and the opposite end 263 of the cylindrical wall 63 meet to provide an air-tight and liquid-tight seal.

The separator 68A is shown comprising a plurality of tubes 69A that are connected and are in fluid communication with the inlet 22A and the outlet 23A. The separator 68B comprises a plurality of tubes 69B that are connected and are in fluid communication with the inlet 22B and the outlet 23B. The separators 68A, 68B each further comprise connectors 67 attached at each end of the plurality of tubes 69A, 69B. Each of the connectors 67 may be threaded and may mate with oppositely threaded hollow connectors 168 attached at the ends of the inlets 22A, 22B and the outlets 23A, 23B adjacent to the separators 68A, 68B to provide for the flow of the fluid therethrough. Alternatively, any suitable connection device may be used as long as it provides an air-tight seal between the inlet 22A, 22B and one end of the tubes 69A, 69B and the outlet 23A, 23B and other end of the tubes 69A, 69B and provides for the flow of fluid therethrough. In the embodiment shown, the number of tubes 69A, 69B are typically between about 1 to about 125; the size of the tubes 69A, 69B may be from about 5 to about 25 feet (from about 152 to about 762 cm) in length and from about 0.025 to about 0.05 inches (from about 0.064 to about 0.13 cm) in wall thickness and the vacuum chamber 62 has a volume of 3 liters to 15 liters. In alternative embodiments the separator 68 may be a single tube or pipe.

The vacuum chamber 62 may be provided with vertical or horizontal support structures (not shown) to maintain the shape of the vacuum chamber 62 when the degasser 60 is in use and the pressure in the vacuum chamber 62 is reduced.

Processing fluid (not shown) flows through the vacuum chamber 62 of the degasser 60 while the vacuum chamber 62 is evacuated at the vacuum port 66 to reduce the pressure in the vacuum chamber 62. As a result of this pressure differential, the entrapped or dissolved gas molecules in the fluid permeate through the tubes of the separator 68 and are evacuated through the vacuum port 66. This process results in a substantially gas-free processing liquid at the downstream end of the degasser 60.

The preferred material for the pipe is a synthetic fluoropolymer such as Teflon® (a trademark of E.I. duPont de Nemours & Co., Inc. of Wilmington, Del.). More preferably the material for the pipe is FEP Teflon® (the fluorinated ethylene propylene (FEP) form of Teflon®) although the perfluoroalkoxy (PFA) or polytetrafluoroethylene (PTFE) forms of Teflon® may also be adequate. PTFE is a highly stable thermoplastic tetrafluoroethylene homopolymer composed of at least 20,000 $C_2F_4$ monomer units linked into very long unbranched chains. FEP Teflon® has the advantage that it provides separator tubes 69A, 69B which are porous enough to allow molecules of typical inert pressurizing gasses to pass through it while at the same time being impervious to the molecules of TEOS or other commercially available reactants. FEP is also suitable as it has enough structural strength to withstand the pressure differential across it when formed as a pipe of the dimensions described above. Furthermore, FEP is an industry-accepted material for use in semiconductor processing operations. It has been found that FEP is of a relatively high purity and does not outgas and inject impurities into any processing environment or the processing fluid. This is not necessarily true of other materials which would otherwise be suitable for use as a separator 68 in the degasser 60 of the invention.

FIG. 2 further illustrates a membrane 76 that surrounds the separators 68A and 68B in the vacuum chamber 62. The membrane 76 has an opening 78 proximate the vacuum port 66. FIG. 2 still further illustrates an optional low wattage heater 80 located inside the vacuum chamber 62. The heater 80 functions, when desired, to raise the temperature of the membrane 76 by a few degrees, typically 10° Celsius, and thereby enhance its permeability.

Although not shown, it is envisaged that any embodiment of the degasser 60 of the invention could include a sensor to detect the failure of the separator 68. This failure could occur, for instance, if the separator 68 disconnects from the connectors 67 or a tube 69A, 69B ruptures. Such failure can be detected, for example, by placing a liquid sensor in the bottom of the vacuum chamber 62 of the degasser 60 to sense any liquid accumulating as a result, for example, of a ruptured separator tube 69A, 69B. Alternatively, a pressure sensor could be placed near the vacuum port 66 or elsewhere as described below to detect any sudden changes of pressure within the vacuum chamber 62 which would occur in the event of tube failure or other failure associated with the separator 68, such as a leak at a connection or in the inlet or outlet lines.

In the embodiment shown in FIG. 2, the number of inlets 22A, 22B is equal to the number of separators 68A, 68B. Similarly, the number of outlets 23A, 23B is equal to the number of separators 68A, 68B. The same or different chemicals may be fed through the first flow path or train A through the vacuum chamber 62 comprising the inlet 22A, the separator 68A, and the outlet 23A, and the second flow path or train B through the vacuum chamber 62 comprising the inlet 22B, the separator 68B, and the outlet 23B. The inlet 22A is connected to a source line 38 which is connected to a first source (not shown) for the first fluid and the inlet 22B is connected to a source line 39 which is connected to the first source or to a second source (not shown) for the same first chemical (from either the first or second source) or a second chemical from the second source.

Figure 3:
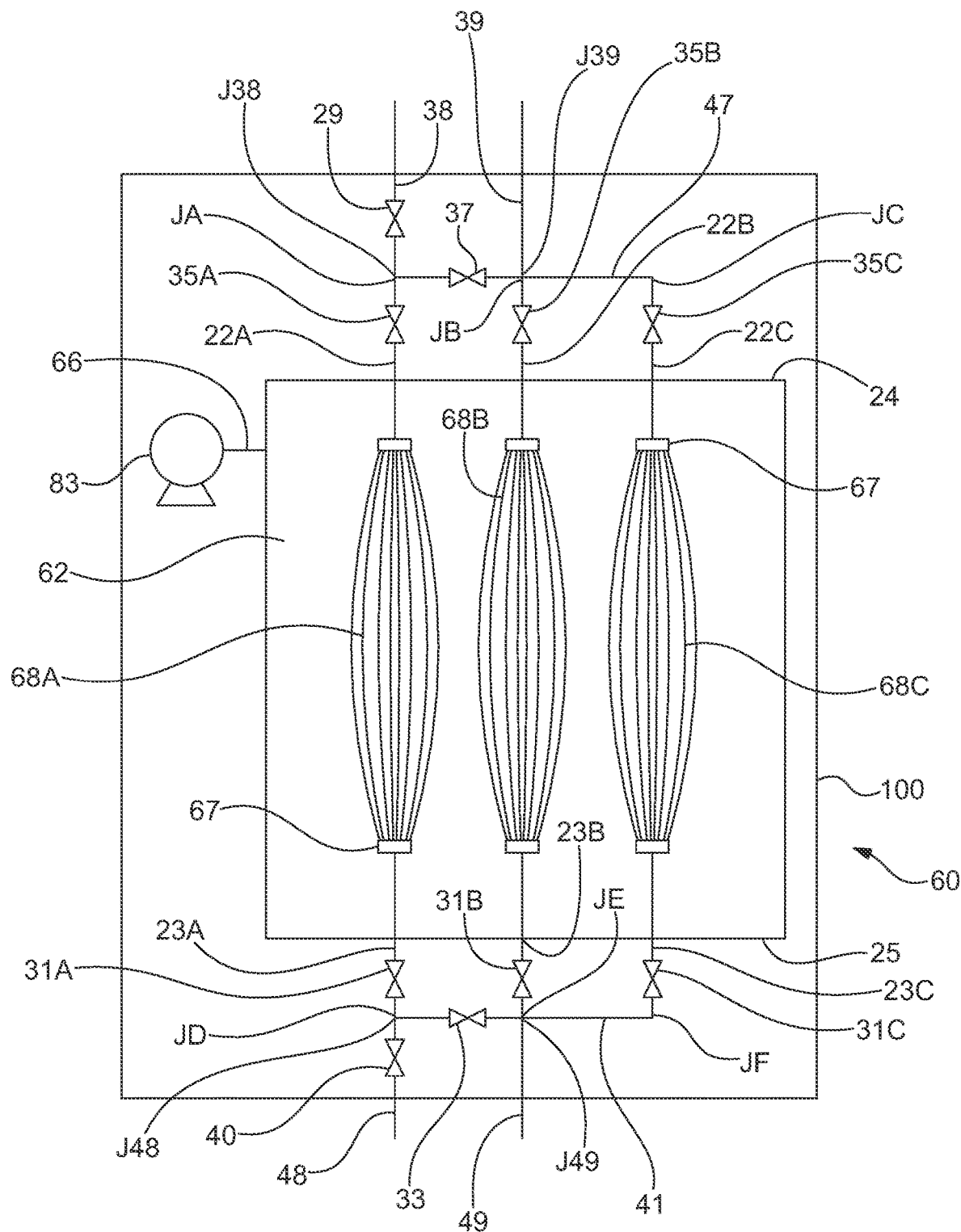
FIG. 3 is a cross-sectional schematic view of a degasser according to an embodiment of the invention.

FIG. 3 shows an alternative embodiment of a degasser 60 of the invention comprising three separators 68. In the embodiment of the degasser 60 shown in FIG. 3, the number of inlets 22 is again equal to the number of separators 68 and the number of outlets 23 is also equal to the number of separators 68. The degasser 60 comprises a housing 100 in which is located the vacuum chamber 62, a pump 83, one or more than one source lines into the housing 100, one or more than one exit pipes out of the housing 100, and valves and other lines to direct the one or more than one fluid (chemicals) to each of the separators 68.

In the embodiment shown in FIG. 3, there are first, second, and third separators 68A, 68B, and 68C. FIG. 3 shows piping on the exterior of the vacuum chamber 62 upstream and downstream of the separators 68A, 68B, 68C that may include multiple source lines and exit lines. On the inlet side of the separators 68, as shown, the first and second source lines 38, 39 are included upstream of the first, second, and third inlets 22A, 22B, 22C that can be used to flow one or two different or the same fluid chemical streams to one or more than one of the separators 68A, 68B, 68C. In addition, the degasser piping includes a feed line 47 that is downstream of the source lines and connects the one or more source lines to the first, second, and third separators 68A, 68B and 68C, which in this embodiment is by connecting the feed line 47 at the first, second, and third junctions JA, JB, and JC to the inlets 22A, 22B and 22C, respectively. (In alternative embodiments, the feed line 47 may be downstream of the inlets 22 and be located inside the vacuum chamber 62.) The source line 38, as shown, has a valve therein upstream of its connection J38 with the feed line 47. The source line 39 connects to the feed line 47 at a connection J39. The junctions, also referred to as connections, may be the same or different. Suitable junctions are, for example, two-way or three-way or four-way fittings.

Each of the inlets 22A, 22B, 22C is connected to each of the separators 68A, 68B, 68C, respectively, as described above for FIG. 2. The feed line 47 may include one or more valves in it. As shown the feed line 47 has one valve 37 in it located between junctions JA and JB. Each of the first, second, and third inlets 22A, 22B, 22C has a first, second, and third valve 35A, 35B, and 35C, respectively, in them located downstream of the first, second, and third junctions JA, JB, and JC within the feed line 47. If a single source of fluid is going to be used to flow fluid into the degasser 60, then the valve 37 may be closed and the fluid will flow through the source line 39 and, depending upon the flow rate of that fluid to the degasser 60, only one, two, or all three of the valves 35A, 35B, and 35C will be open to allow the fluid to flow through one, two, or all three of the separators 68A, 68B, 68C, respectively. If the flow rate from the single source of fluid is low, only one valve, for example, the valve 35B will be open so the fluid will flow into the vacuum chamber 62 via the inlet 22B which is fluidly connected to the separator 68B. If the flow rate of the fluid in the source line 39 is large enough to require two separators, then the valve 37 may be (or will remain) closed and the flow of the fluid may be via the source line 39 to the feed line 47, through the open valves 35B and 35C to the separators 68B and 68C, respectively. If on the other hand, the flow of fluid through the source line 39 is enough for three separators, then a valve 29 in the source line 38 will be closed; the valve 37 in the feed line 47 and the valves 35A, 35B, and 35C in the inlets 22A, 22B, and 22C will all be open and the fluid will flow into and through the separators 68A, 68B, and 68C.

Downstream of the separators 68A, 68B, 68C there is also optional piping provided in the degasser 60 as shown in FIG. 3. As shown, the degasser 60 comprises the outlets 23A, 23B, and 23C; the valves 31A, 31B, and 31C in each of the outlets 23A, 23B, and 23C, respectively; and a collection line 41 fluidly connected to the outlets 23A, 23B, and 23C and fluidly connected to two exit lines 48 and 49. The exit pipes 48 and 49 are connected to the collection line 41 via connectors J48 and J49, respectively. The outlets 23A, 23B, and 23C are connected via the junctions JD, JE, and JF, respectively, to the collection line 41. The degasser 60 also comprises a valve 40 in the exit line 48 (downstream of the collection line 41) and a valve 33 in the collection line 41 between junctions JD and JE. As described above for the embodiment shown in FIG. 3, if the separator 68B is the only separator through which fluid is flowing then the valve 31B will be open and the valves 33 and 31C may be closed to direct the degassed fluid into and through exit line 49 to the one or more tools (not shown) downstream of the degasser 60. If the separators 68B and 68C are degassing the same fluid as earlier described, the valve 33 will be closed and the valves 31B and 31C will be open. If all three separators 68A, 68B, and 68C are degassing fluid, and only one exit line is to be used, then the valve 40 will be closed and the valves 31A, 31B, and 31C will be opened.

If more than one fluid source is used, then the source lines 38 and 39 will be used to flow fluid into the degasser 60. The fluids degassed may be the same or different. If the fluids from the first and second fluid sources are the same, and all of the separators are on-line, then all of the valves upstream of the separators may be open. Alternatively, if the first and second fluids to be degassed are not the same, then the one or more separators used to degas the first fluid must be isolated from the one or more separators used to degas the second fluid. So, for example, if a first fluid flows into the degasser 60 via the source line 38, and a second fluid flows into the degasser 60 via the source line 39 then the valve 37 in the feed line 47 and the valve 33 in the collection line 41 will be closed to isolate a first fluid train from a second fluid train. The first fluid in the first source line 39 will flow through the first junctions J39 and JB, the first valve 35B in the first inlet 22B into the first separator 68A, the first valve 31A in the first outlet 23A, the first junctions JD and J48, the valve 40, and the first exit line 48. The second fluid in the second source line 39, if the valve 35C connecting the feed line 47 to the third separator 68C is closed, will flow to and through the second junctions J39 and JB, the second valve 35A, the second inlet 22B into the second separator 68B, and then to and through the second outlet 23B, the second valve 31B (preferable the valve 31C will be closed), the second junctions JE and J49, the second valve 40 to and through the exit line 48. If the flow rate of the second fluid is large enough, then the second fluid will flow through the second and third separators 68B and 68C. The second and third valves 35B, 35C in the second and third inlets 22B and 22C, respectively, will be open for the flow of the second fluid into the second and third separators 68B, 68C. In addition, the valves 31B, 31C downstream of the second and third separators 68B, 68C in the second and third outlets 23B, 23C will be open for the flow of the second fluid.

Figure 4:
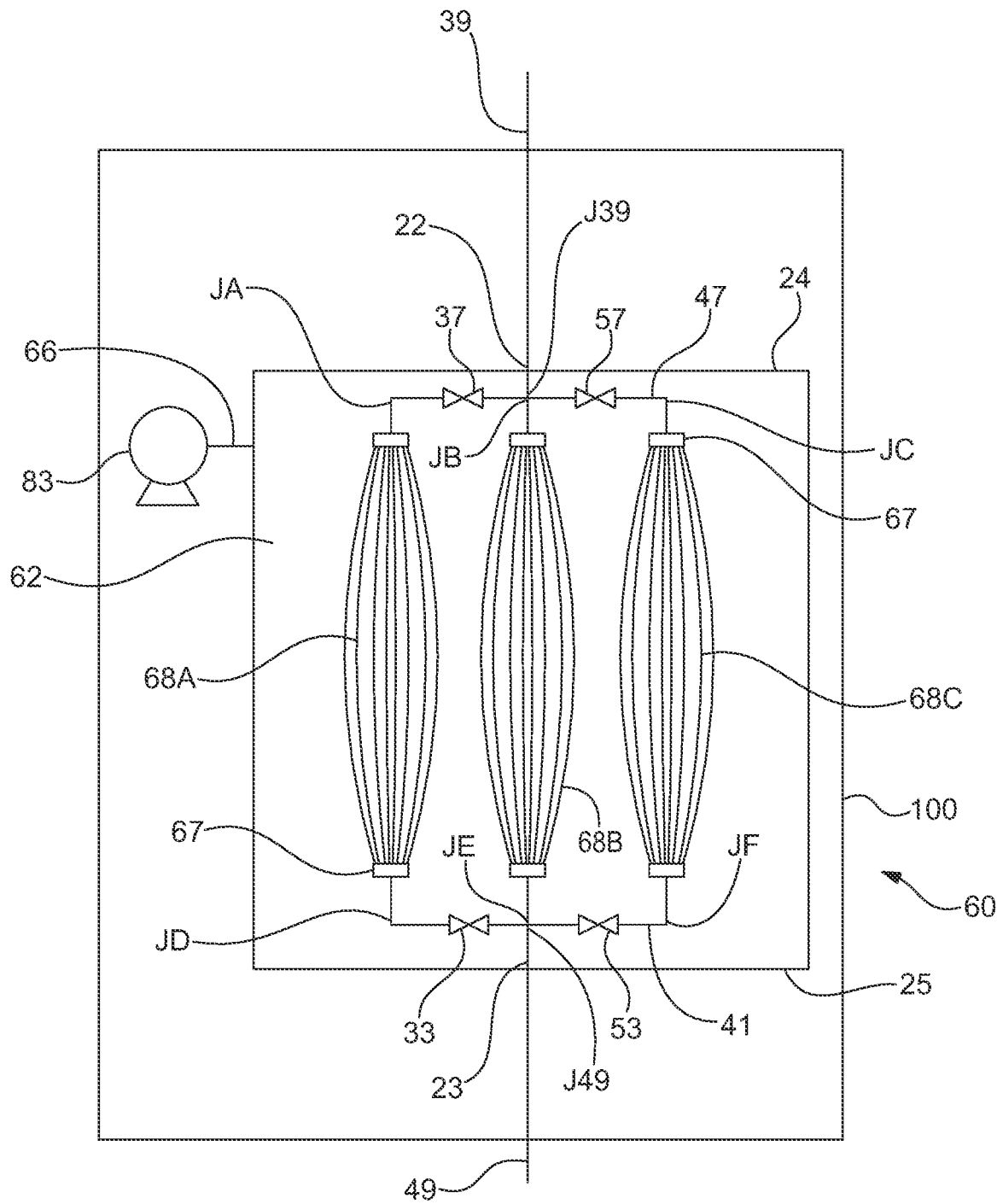
FIG. 4 is a cross-sectional schematic view of a degasser according to an embodiment of the invention.

In the embodiment shown in FIG. 4, the number of inlets 22 is fewer than the number of separators 68. Similarly, the number of outlets 23 is fewer than the number of separators 68. The degasser 60 shown in FIG. 4 is designed for a single chemical of increasing or decreasing flow rate to be degassed. The degasser 60 shown in FIG. 4 allows for an increase in the flow rate of a single chemical to be degassed without the capital cost and footprint requirements of adding a second degasser system. In the embodiment shown in FIG. 4, the chemical to be degassed may be fed through a first flow path through the vacuum chamber 62 comprising the inlet 22, the first separator 68A, and the outlet 23 and/or the second flow path through the vacuum chamber 62 comprising the inlet 22, the second separator 68B, and the outlet 23 and/or the inlet 22, the third separator 68C, and the outlet 23. The inlet 22 is connected to the source line 38 which is connected to a source (not shown) for the fluid. The outlet 23 is connected to an exit line which provides the degassed fluid to one or more tools (not shown).

In the embodiment shown in FIG. 4, the degasser 60 comprises more than one separator (namely, first, second, and third separators 68A, 68B and 68C), the inlet 22, the feed line 47, the collection line 41, and the outlet 23. In this embodiment, the first, second, and third separators 68A, 68B, and 68C connect with the feed line 47 at the junctions JA, JB, and JC and with the collection line 41 at the junctions JD, JE, and JF. The feed line 47 and the collection line 41 are located in the interior of the vacuum chamber 62 upstream and downstream of the separators 68A, 68B, 68C. (As shown, there is a single source line 39, but as in the embodiment shown in FIG. 3 one or more additional source lines and inlets could be added to the present embodiment, if desired. In addition, if desired one or more of the feed line 47 and/or the collection line 41 could be located outside the vacuum chamber 62.) The degasser piping includes the feed line 47 downstream of the source line 39 and in this embodiment, downstream of the one or more than one inlet 22. (As was shown in FIG. 3, the feed line 47 was upstream of the one or more than one inlet 22 on the exterior of the vacuum chamber 62.) The feed line 47 connects the one or more than one source line 39 to the separators 68, which in this embodiment is by connecting the feed line 47 at the junctions JA, JB, and JC to the first, second, and third separators 68A, 68B, 68C.

The source line 39 connects to the feed line 47 at the connection J39. (The junctions and connections may be the same or different. One or more than one of two-way or three-way and/or four-way pipe fittings may be used for the junctions and connections and in this and the other embodiments, the junctions and connections can be positioned anywhere on the feed line 47 and the collection line 41, not just as shown.) The junctions JA, JB, and JC in the feed line 47 may connect directly to each of the separators 68A, 68B, 68C, respectively, or there may be some pipes or alternative fittings between one or more of the junctions JA, JB, and JC and the one or more separators 68A, 68B, 68C, respectively. In some embodiments, quick release valves (not shown) may be included between one or more of the junctions JA, JB, and JC and one or more of the separators 68A, 68B, 68C, respectively.

The feed line 47 may comprise one or more valves in it. As shown, the feed line 47 has one valve 37 located between junctions JA and JB (the junctions that are in fluid communication with the first and second separators 68A and 68B, respectively). As shown, the feed line 47 has a second valve 57 located between the junctions JB and JC (the junctions that are in fluid communication with the second and third separators 68B and 68C, respectively). The embodiment in FIG. 4 is designed so that the separator 68B is always on-line if there is fluid flowing through the degasser 60. The valves 37 and 57 can both be closed, both be open, or individually be opened and closed or closed and open, respectively, to prevent or allow the flow of fluid into both or each of the separators 68A and 68C, respectively, based on the volume of fluid to be degassed.

At the exit end of the separators 68A, 68B, and 68C are junctions JD, JE, and JF with the collection line 41. The collection line 41 may have one or more valves in it. Typically, the number of valves in the collection line 41 will match the number of valves in the feed line 47. As shown, there is the valve 33 between the first and second junctions JD and JE, and a valve 53 between the second and third junctions JE and JF. When the separator 68A is not on-line, that is when the valve 37 is closed, then the valve 33 will also be closed. When the separator 68C is not on-line, that is when the valve 57 is closed, then the valve 53 will also be closed. After a period of operation, when the separator 68B has been the only separator on-line (degassing fluid), if demand for the fluid increases or a second tool is brought on-line to which the same chemical fluid is fed, an additional separator or separators 68A and/or 68C may be brought on-line by opening the valve in the feed line and the corresponding valve in the collection line that will provide for the flow of fluid to and through the one or more separators. For the separator 68A, the valves 37 and 33 will be opened, and/or for the separator 68C, the valves 57 and 53 will be opened to provide the flow of fluid to be degassed to and through those separators.

In alternative embodiments the feed line 47 may be external to the vacuum chamber 62 and the collection line 41 may be internal to the vacuum chamber 62 and/or the feed line 47 may be internal to the vacuum chamber 62 and the collection line 41 may be external to the vacuum chamber 62. Having the feed line 47 and collection line 41 internal to the vacuum chamber 62 may provide fewer inlets 22 and outlets 23 that must penetrate the one wall or more than one walls of the vacuum chamber 62. Fewer penetrations through the walls decreases the chances of a leak in one of the penetrations. On the other hand, if the feed line 47 and/or the collection line 41 is located external to the vacuum chamber 62, the vacuum chamber 62 can be decreased in size and if repairs need to be made to the feed line 47 and/or the collection line 41 or to the valves or valve controls in either or both of the feed line 47 and/or collection line 41 therein, then they are easier to access if located externally of the vacuum chamber 62. If the feed line 47 and the collection line 41 are located inside the vacuum chamber 62 one or both of the top wall 24 and the bottom wall 25 may be removable and/or the vacuum chamber 62 may be provided with an access door (not shown) having an air-tight seal.

In an additional aspect of the invention, the separators 68 used in the degasser 60 may be designed to degas a certain volume of fluid, but the volumes of the separators 68 do not have to be equivalent. For example, standard separators may be made to degas, for examples, 0.5 volume of fluid/minute, 1 volume of fluid/minute, and 0.8 volume of fluid/minute. So, for example, if a separator is in use and is degassing 1 volume of fluid/minute and the end-user needs to increase the volume to 1.5, a 0.5 volume of fluid/minute separator can be brought on-line inside the same vacuum chamber 62. In one embodiment, each separator 68 will comprise a plurality of tubes. To vary the volume of fluid that a separator can degas, the number of tubes can be increased or decreased for each separator. If the fluid demand increases from 1 volume of fluid/minute to 1.5 volume of fluid/minute, then the number of tubes used in a second separator brought on-line will be half the number of tubes in the separator that was already on-line.

In alternative embodiments any of the valves that isolate a separator that is not in use may be replaced with a plug (not shown) instead. Plugs can be provided when the separators, for example separators 68A and 68C, are not provided with the equipment when originally installed, but will allow for the easy replacement and installation of one or more than one of the separators 68A, 68C in fluid communication with the feed line 47 and the collection line 41 and optionally one or more than one of the valve pairs 37 and 33 or 57 and 53 in the feed line 47 and the collection line 41, if the need for degassed fluid increases. In one embodiment, the degasser 60 may be installed with only a first or only first and second separators, for example, separator 68B or separators 68A and 68B, and plugs (not shown) may be provided instead for either or both of the valves 37 or 57 and/or the valves 33 and 53. The plugs will have to be removed and one or more separators installed into the degasser 60 before allowing fluid to flow into those separators.

Figure 5:
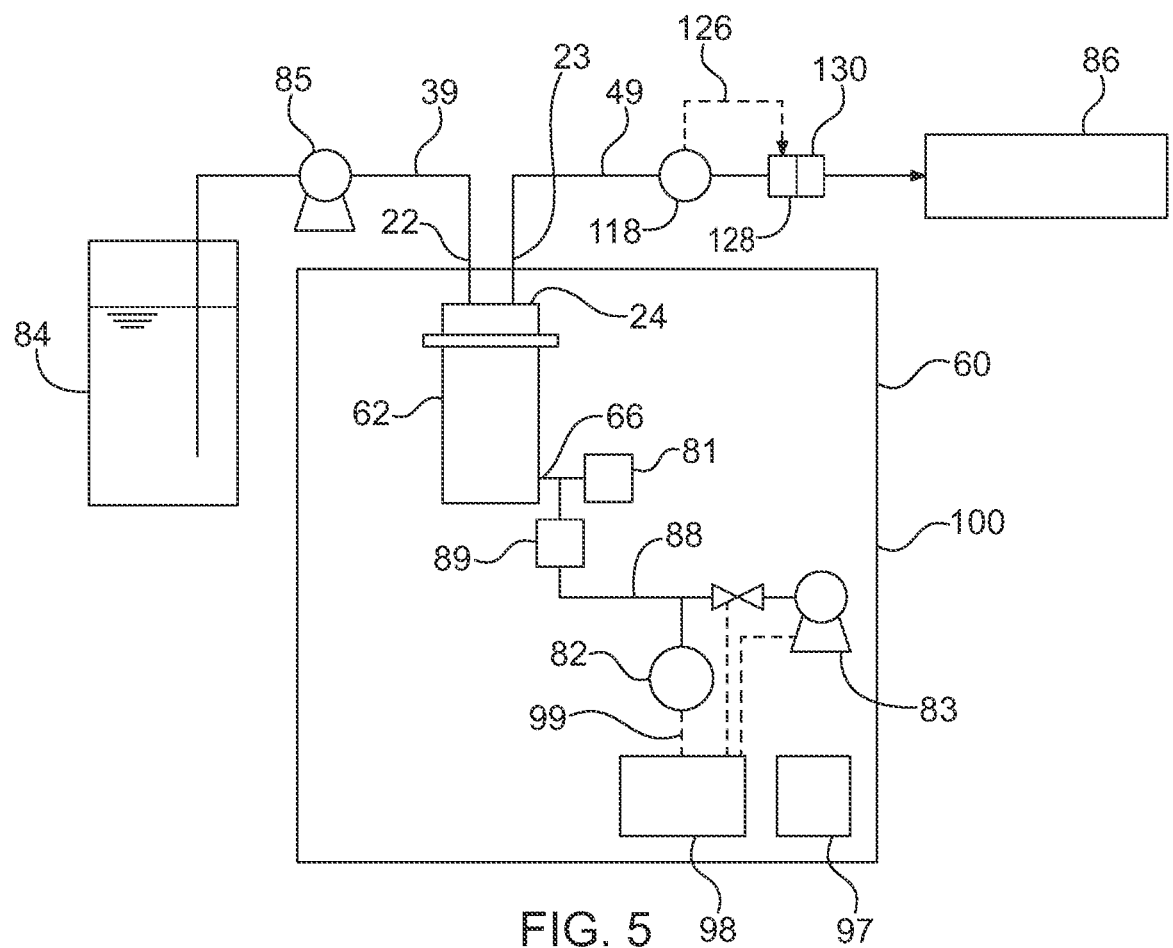
FIG. 5 is a schematic diagram of a degassing system using an embodiment of the degasser of the present invention.

FIG. 5 shows a schematic diagram of a degassing system having additional aspects. The degasser 60 is disposed between a source 84 for the fluid to be degassed (which is, as shown, a tank) and a point of use 86 of the fluid that has been degassed. The degasser 60 includes: the vacuum chamber 62; the vacuum pump 83 (which is used to represent any decompression device that may be used) for decompressing the inside of the vacuum chamber 62 to a pressure lower than atmospheric pressure; a vacuum suction pipe that connects the vacuum pump 83 to the vacuum port 66 of the vacuum chamber 62 to form a vacuum line 88; a pressure gauge 82 for measuring the pressure in the vacuum suction pipe 88; and a liquid leakage sensor 81 located at a position closer to the vacuum chamber 62 than the position of the pressure gauge 82 in the vacuum line. The degasser system also comprises a control system 98 and a human-machine interface or HMI 97 and electrical and/or mechanical components to open and close valves and adjust the pump speed. The vacuum chamber 62 is installed in the degasser housing 100 in such a manner that the top wall 24 of the vacuum chamber 62 is oriented vertically upward, and the inlet 22 and the outlet 23 both pass through the top wall 24, and the inlet 22 and the outlet 23 are both oriented vertically upward. An optional pump 85 removes the fluid held in the fluid source 84 and sends the fluid to the degasser 60, and then sends the degassed fluid to the point of use 86. The pump 85 may be omitted if the head of the fluid source 84 is otherwise pressurized resulting in fluid flow to the degasser 60. Further in alternative embodiments the optional pump 85 and the fluid source 84 may be within the housing 100, too.

In the degasser 60 shown in FIG. 5, the pressure gauge 82 disposed on the vacuum line 88 between the vacuum chamber 62 and the vacuum pump 83 electrically communicates the amounts it measures to a control system 98 via a data transmitter 99 (hardwired, wireless, or otherwise) to check for fluctuation. The control system 98 uses that information to communicate with the vacuum pump 83 to cause the vacuum pump 83 to speed up or slow down. In the preferred embodiment, the pump 83 is a variable speed pump that makes it possible to maintain the same level of reduced pressure in the vacuum chamber 62 whether one or two or three or more separators 68 is/or are degassing fluid in the vacuum chamber 62 while reducing the wear of the vacuum pump 83.

In addition, the degasser 60 may comprise the liquid leakage sensor 81 to determine if there is any leak in the vacuum chamber 62 that may be caused by, for example, a leaking tube in a tube bundle 69A, 69B or a leaking connector 67. If a leak is detected, the degassing process should be stopped. The suitable types of liquid leakage sensor 81 are not limited. For example, a liquid leakage sensor 81 having two conducting wires to detect a change in resistance between the conducting wires, an ultrasonic liquid detector, or a liquid leakage sensor of the optical fiber type can be used. Moreover, a detector, such as the liquid leakage sensor 81 and a vacuum gauge, may be disposed in the vacuum chamber 62 of the degasser 60.

As shown in FIG. 5, a liquid trap 89 may be disposed on the vacuum line 88 between the vacuum chamber 62 and the vacuum pump 83 in the degasser 60. The liquid trap 89 prevents the fluid to be degassed that has flowed into the vacuum line 88 via the vacuum port 66 from being drawn into the vacuum pump 83 and contacting the pressure gauge 82. When thus configured, the pressure gauge 82 and the vacuum pump 83 can be protected from failure.

It is possible to use as the liquid trap 89 a small chamber capable of holding a liquid, and a component including a gas-permeable filter that allows a gas to permeate therethrough while preventing a liquid from permeating therethrough. A specific example of such a gas-permeable filter is a porous filter including a porous membrane made of fluororesin or polyolefin resin. Specifically, the liquid trap 89 is disposed between the liquid leakage sensor 81 and the vacuum pump 83 on the vacuum line 88, preferably between the liquid leakage sensor 81 and the pressure gauge 82.

The degassing system shown in FIG. 5 further comprises the flow meter 118 that measures the flow rate of the degassed fluid flowing therethrough and adjusts a control valve to increase or decrease the flow of the degassed fluid to the point of use 86. If there is increased or decreased demand, the flow meter 118 will communicate with the control system 98 that will automatically open and close valves in the degasser 60 to flow fluid to one or more additional separators or one or more fewer separators in response to the demand for degassed fluid. In addition, the speed of the optional pump 85 may be adjusted in response to the control system 98 in response to the increased or decreased demand. Alternatively, the fluid flow may be adjusted manually (as compared to automatically) by opening closed valves in fluid communication with one or more than one separator 68 and directing fluid through the one or more than one separator 68 (optionally in response to sensors sensing or the manual increase in demand for the degassed fluid at the point of use 86).

Alternatively, or in addition, the automatic or manual process of opening closed valves may be in response to the flow meter 118 or the rate of change of the fluid weight measured by a scale (not shown) measuring the weight of the fluid source 84. In alternative embodiments, the scale and the source 84 of the fluid may optionally be located within the housing 100, in addition to the pump 85 and optionally one or more of the flow meter 118, the control valve 128, and the vaporizer 130. The fluid control valve 128 is in communication via the connection line 126 with the flow meter 118.

The present invention has been described with reference to specific embodiments. Modifications may be apparent to those skilled in the art. Such modifications are included in the disclosure.

The invention claimed is:

1. A degasser for removing molecules of gasses entrapped or dissolved in a processing liquid, the degasser comprising:
    a vacuum chamber having one or more than one vacuum chamber wall;
    one or more than one fluid inlet and one or more than one fluid outlet through which the processing liquid is respectively passed into and out of the vacuum chamber, the one or more than one inlet and the one or more than one outlet penetrating at least one of the vacuum chamber walls;
    two or more separators located inside the vacuum chamber and being configured to be pervious to the molecules of the entrapped or dissolved gas but impervious to the processing liquid;

at least one vacuum for applying through a vacuum port a pressure differential across the two or more separators to cause the molecules of the entrapped or dissolved gas to leave the processing liquid and to permeate through the two or more separators thereby removing the entrapped or dissolved gas from the processing liquid;

one or more than one feed line in fluid communication with the one or more than one inlet and the two or more separators; and at least one valve upstream of each separator except for one separator so that all but one separator can be isolated from that one separator.

2. The degasser of claim 1 comprising the one or more than one feed line connected to the one or more than one inlet and having two or more than two junctions (JA, JB, JC) connecting two or more than two separators to the one or more than one feed line if there are more separators than inlets.

3. The degasser of claim 1 comprising three or more separators.

4. The degasser of claim 1 comprising one inlet.

5. The degasser of claim 1 comprising two or more inlets.

6. The degasser of claim 1 comprising three or more inlets.

7. The degasser of claim 1 comprising one outlet.

8. The degasser of claim 1 comprising two or more outlets.

9. The degasser of claim 1 comprising three or more outlets.

10. The degasser of claim 1 comprising one feed line in fluid communication with the two or more separators.

11. The degasser of claim 1 comprising one feed line in fluid communication with three or more separators.

12. The degasser of claim 1 comprising a collection line in fluid communication with the two or more separators.

13. The degasser of claim 1 comprising a collection line in fluid communication with three or more separators.

14. The degasser of claim 12 comprising at least one valve in the one or more than one feed line and at least one valve in the collection line that when closed isolate a flow path comprising an inlet, a separator, and an outlet from one or more other flow paths comprising one or more than one other separator in the degasser.

15. The degasser of claim 1 further comprising a pressure gauge and a variable speed pump in fluid communication with the vacuum chamber.

16. The degasser of claim 15 further comprising a control system in electrical communication with the pressure gauge and the pump to adjust the pump speed of the variable speed pump when the pressure is not at a predetermined pressure.

17. The degasser of claim 1 wherein a first separator degasses a first processing fluid and a second separator degasses a second processing fluid.

18. The degasser of claim 1 further comprising a housing.

19. The degasser of claim 13 comprising at least one valve in the one or more than one feed line and at least one valve in the collection line that when closed isolate a flow path comprising an inlet, a separator, and an outlet from one or more other flow paths comprising one or more than one other separator in the degasser.

* * * * *